Sept. 22, 1959 C. V. BERGSTROM 2,904,849
HOUSING UNIT
Filed April 27, 1953 6 Sheets-Sheet 1
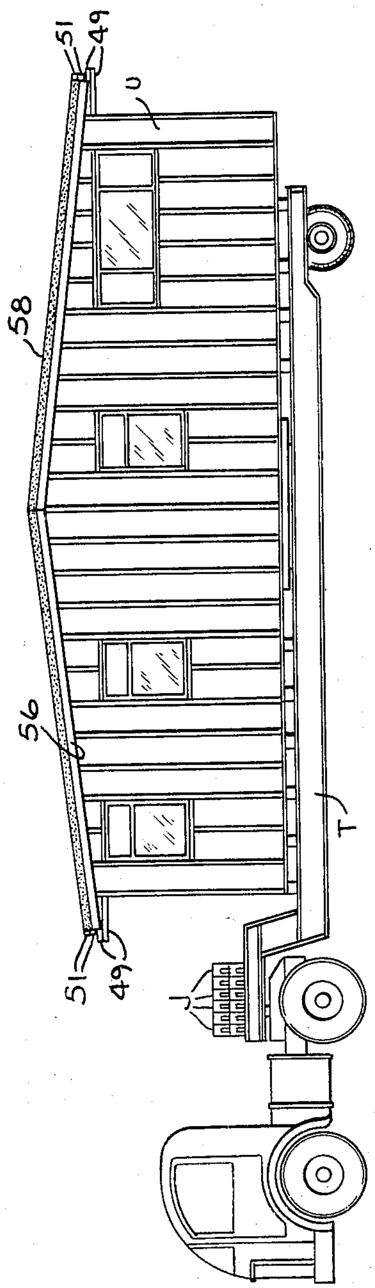
FIG. 1
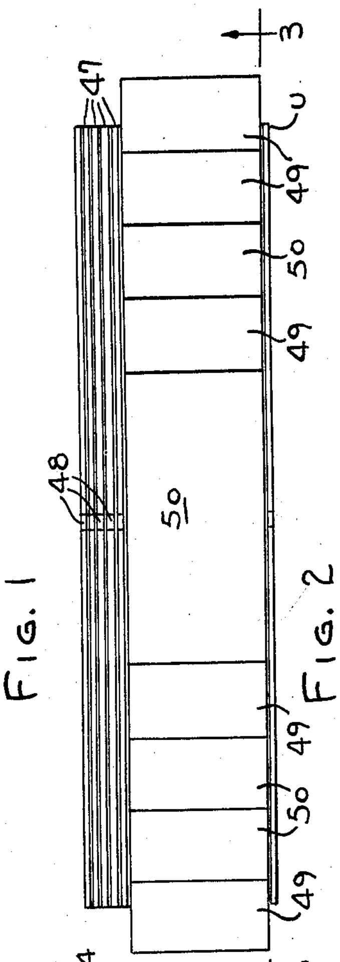
FIG. 2
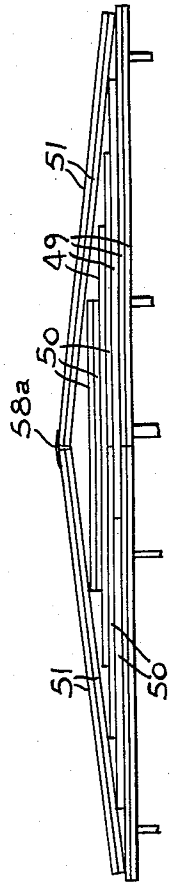
FIG. 3
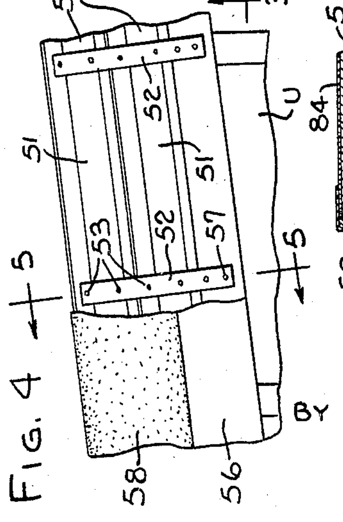
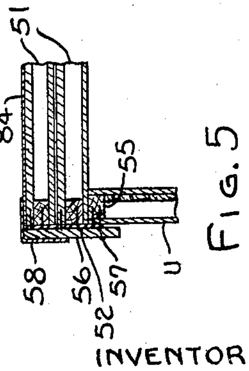
FIG. 5
INVENTOR
Carl V. Bergstrom
BY
Louis O. French
ATTORNEY INVENTOR
Carl V. Bergstrom
BY
Louis O. French
ATTORNEY Sept. 22, 1959 C. V. BERGSTROM 2,904,849

HOUSING UNIT

Filed April 27, 1953 6 Sheets-Sheet 3

INVENTOR
Carl V. Bergstrom
BY
Louis O. French
ATTORNEY

HOUSING UNIT

Filed April 27, 1953 6 Sheets-Sheet 4

INVENTOR
Carl V. Bergstrom
BY
Louis O. French
ATTORNEY

INVENTOR
Carl V. Bergstrom
BY
Louis O. French
ATTORNEY

Sept. 22, 1959 C. V. BERGSTROM 2,904,849

HOUSING UNIT

Filed April 27, 1953 6 Sheets-Sheet 6

INVENTOR

Carl V. Bergstrom

BY

Louis O. French

ATTORNEY

United States Patent Office
2,904,849
Patented Sept. 22, 1959

2,904,849

HOUSING UNIT

Carl V. Bergstrom, San Mateo, Calif.

Application April 27, 1953, Serial No. 351,099
4 Claims. (Cl. 20—2)

The invention relates to a housing unit.

The general object of the invention is to provide a housing unit formed of prefabricated parts, some of which are completely assembled to form sections of the completed house and the parts being assembled together for shipment as a single legal load truck shipment, that is, a load of not more than eight feet wide and of a height to comply with highway regulations. More particularly, the invention is a further development of the housing unit disclosed in my pending application Serial No. 95,969, filed May 28, 1949, and is a result of experience gained in the building and erecting of housing units covered by said application.

More particularly, the invention herein resides in an improved divisional arrangement of the expandible sections, improvements in the means for holding these sections together during shipment and the storing of other house parts in or on these sections, improvements in the methods of assembling these parts to form the completed house and other features hereinafter described and more particularly defined by the appended claims.

In the drawings:

Fig. 1 is a side elevation view of a housing unit and parts mounted for shipment on a trailer truck;

Fig. 2 is a top plan view of the unit with the top roof panels used in transit removed;

Fig. 3 is a view looking along the line 3—3 in Fig. 2 with the temporary roof in place;

Fig. 4 is a detailed view of the means for holding the temporary roof in place, parts being broken away;

Fig. 5 is a detailed vertical sectional view taken on the line 5—5 of Fig. 4;

The house includes what will be termed a packaged unit U and additional floor joist beams J. The unit U is adapted to be mounted on the base of the trailer vehicle T while the beams J are stacked and secured to the forward end of the trailer T over its king pin connection with the tractor vehicle as shown in Fig. 1, so that said beams are available for use as skids in the erection of the house.

The package unit U includes completely factory fabricated sections 28 and 29, roof panels, floor panels, roof joists, inner wall panels, floor joists, and side wall panels for the intermediate section of the house, all housed in or on the sections 28 and 29.

Figure 10:
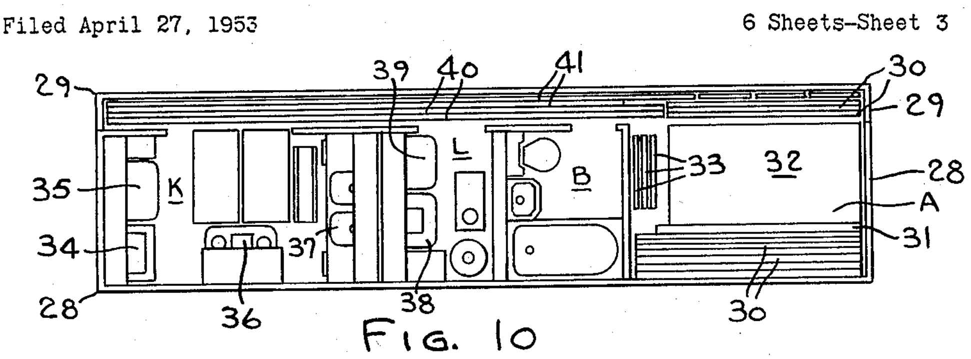
Fig. 10 is a plan view of the packaged sections of the house and parts housed therein.
Figure 9:
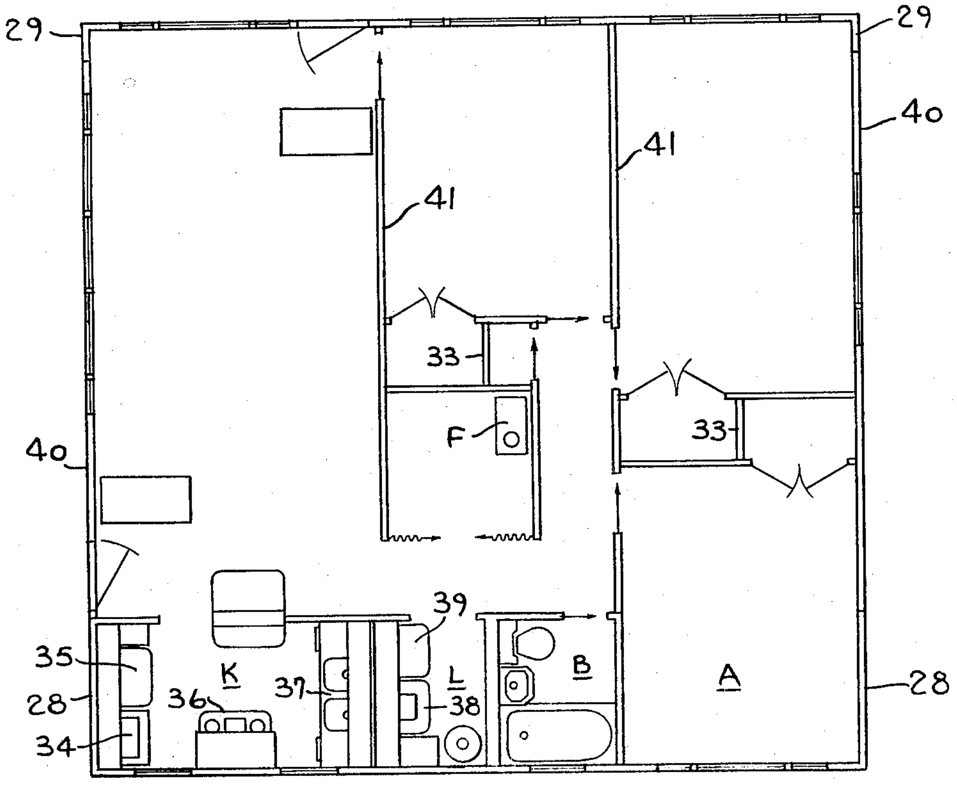
Fig. 9 is a floor plan view of the completed house.

The prefabricated section 28 constitutes what may be termed the main core of the house and is shown in Figs. 9 and 10 and forms about three-quarters of the total width of the packaged unit. This section includes a kitchen K, a laundry L and a bath room B with complete built-in piping ready to be connected to the supply piping mounted in or on the foundation for the house, and an end compartment A within which is stored carport side wall panels 30, extension floor joists 31, floor panels 32, and partition wall panels 33. The kitchen includes a freezer 34, a refrigerator 35, a gas or electric stove 36, and a wash sink 37. The laundry includes a washing machine 38 and a dryer 39.

The prefabricated section 29, about one-fourth as wide as the section 28, provides an enclosure to receive other car port panels 30, side wall panels 40, and inner partition wall panels 41 which are indicated by number in the floor plan view of Fig. 9 and also to carry the roof trusses 47 for the intermediate section of the house to be erected on site.

Figure 11:
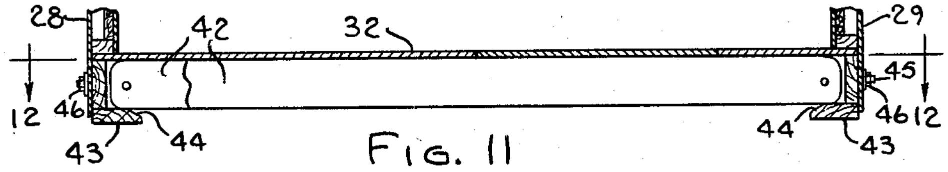
Fig. 11 is a detailed vertical sectional view through the lower portion of the housing unit showing means for holding the sections together during shipment.
Figure 12:
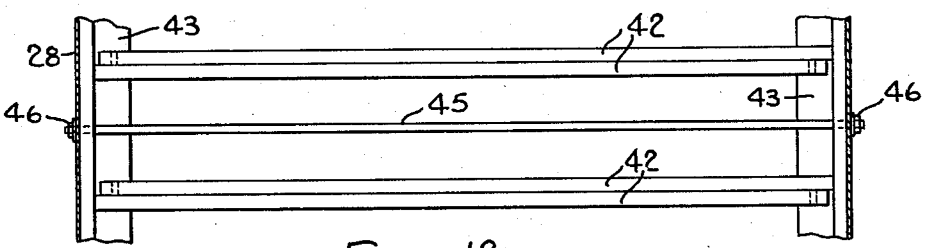
Fig. 12 is a detailed vertical sectional view taken on the line 12—12 of Fig. 11.
Figure 14:
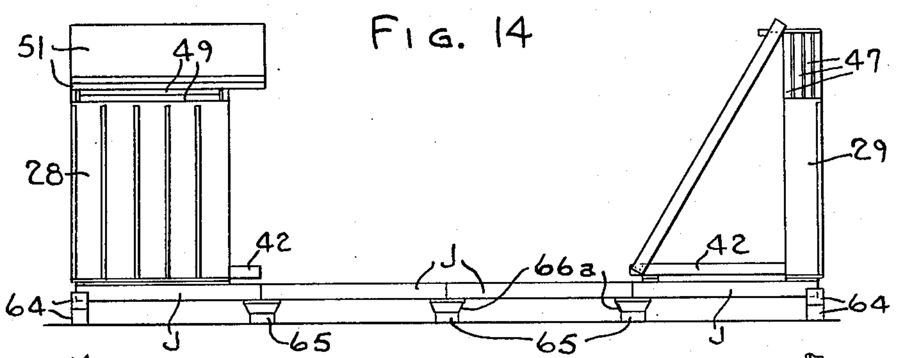
Fig. 14 is a side elevation view including parts shown in Fig. 13 of the sections of the housing unit in spread apart position on site.
Figure 15:
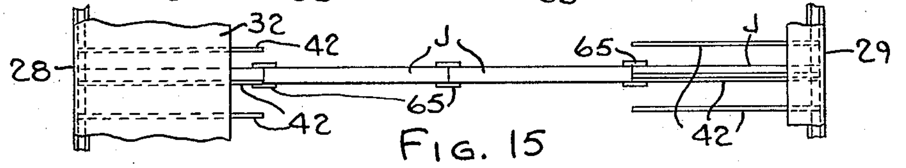
Fig. 15 is a detailed plan view of the parts shown in Fig. 14.
Figure 16:
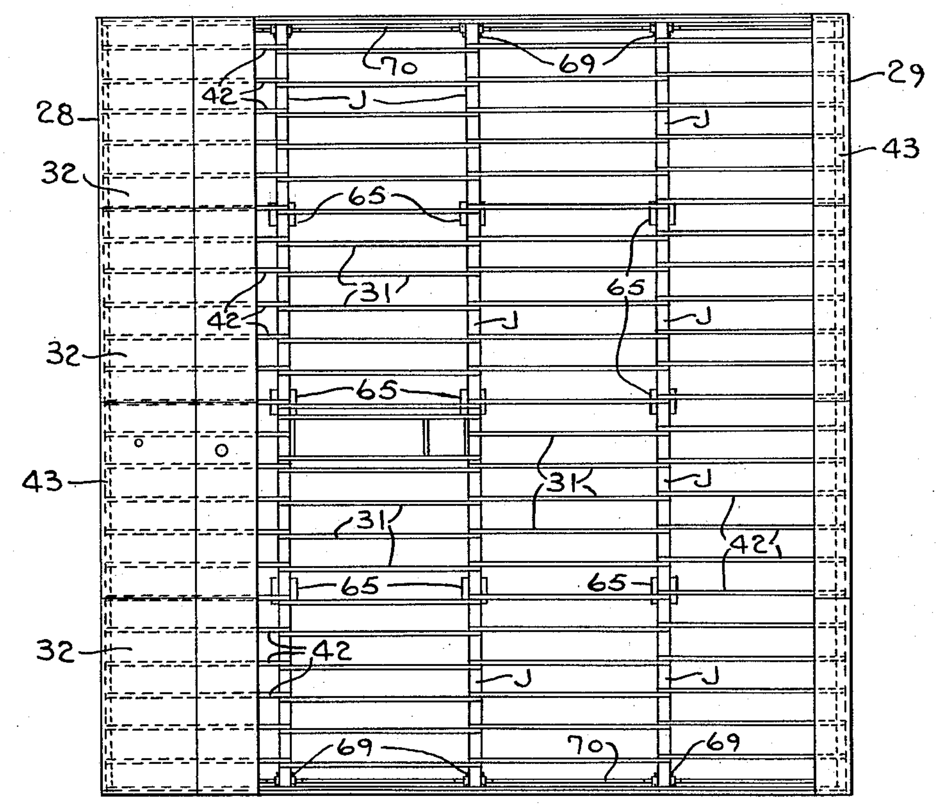
Fig. 16 is a plan view of the separable units and the floor joists in final assembled position.

Each of the sections 28 and 29 has a series of floor joists 42 fixed to and extending inwardly from its outer side wall as shown in Figs. 14 to 16. When these sections are secured together in abutting relation in packaged form as shown in Figs. 10 to 12, pairs of these joists telescope or lie in juxtaposition relative to each other and to prevent the free ends of these joists from sagging and to permit them to act as package reinforcing members the base portions of the walls of each section have longitudinally extending mudsill members 43 which act as ledges upon which the free ends of the joists of the adjoining sections may rest and which members have bevelled or ramped edges 44 to permit the free ends of said joists, whose ends may be slightly rounded or bevelled, to easily ride up on them when the two prefabricated sections are brought together at the factory. To hold these sections in their assembled packed relation for shipment, long metal tie rods 45 having threaded ends to receive nuts 46 securely bolt the sections 28 and 29 together.

To complete the shipping package, the roof trusses 47 for the intermediate section of the house are mounted on the gabled portion of said section on the tops of the side walls of the section 29 (see Fig. 14) so that they are at roof supporting height so that all that is necessary to do is to slide them into final position along the tops of the side walls of the intermediate section erected on site. These roof trusses have a pitch extending from a ridge pole receiving notch 48 (see Fig. 24) to their ends and are of the prefabricated truss type. Arranged to correspond in general to the pitch of said trusses and in a pile over the top of the section 28 are long main roof panels 49 and shorter car port roof panels 50 as indicated in Figs. 3 and 14 so that these panels with the trusses or joists 47 on section 29 form a support for a temporary roof comprising two sets of superimposed long wide roof panels 51 shown in position in Figs. 1 and 3. These roof panels 51 are temporarily secured together and to the gable ends of the shipment package of both sections by metal tie strips 52 (see Figs. 4 and 5) secured by nails 53 to side frame parts 54 of said panels and side frame parts 55 of the sections and are protected from the weather by cover boards 56 temporarily secured by nails 57 to the gable ends of the sections 28 and 29, the joint between the upper ends of these boards and the top roof panels being covered by roofing paper 58 adhesively secured to the edge portions of the top roof panels and the adjacent sides of the boards. The ridge joint between the roof panels are made weathertite as shown in Fig. 3 by a strip of roofing felt 58*a* temporarily secured to said panels. The roof panels 49 are narrower than the roof panels 51 because they need only span the six foot spacing between roof joists, whereas panels 51 not only span this but also extend two feet over the gable to form the offset of the house.

Figure 13:
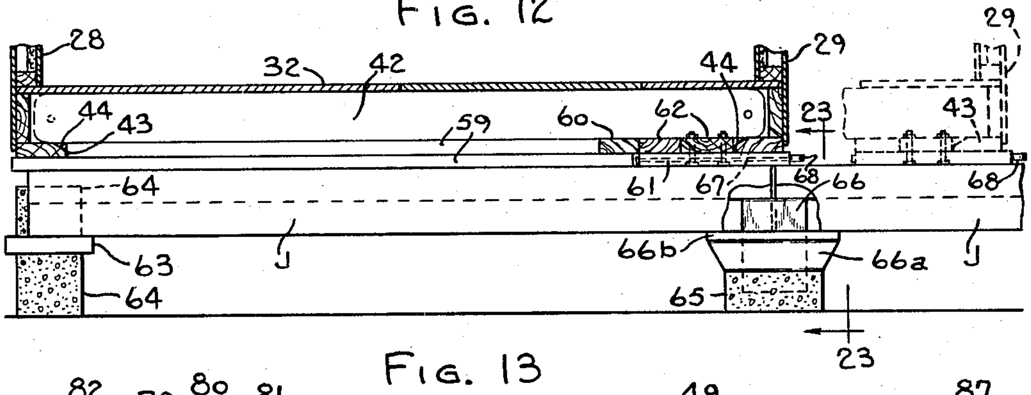
Fig. 13 is a side elevation view, partly in section showing the initial positioning of a section of the house on its site.

When the packaged unit reaches its destination, the truck bearing the unit is maneuvered over the foundation to bring the unit over one end thereof and then the unit is jacked up above the truck so that the truck can be driven off. With the unit in an elevated position the beams J, removed from the truck, are placed in a position on the foundation of the house so that they may act as skids. Temporary skidding shoes are put in place under the section 28 over these skids comprising sets of wood strips 59 and a block 60 for the section 28 and a wood strip 61 and blocks 62 for the section 29 as shown in Fig. 13. Thereafter the unit is lowered onto the skid joists J which at this time run lengthwise of the house, the joists being temporarily supported on blocks 63 mounted on the lower concrete foundation blocks 64 at the sides of the house and on a series of intermediate footings shown in Figs. 13 and 23. Each footing comprises a concrete block 65 having an upright wood block 66 anchored therein and to which side wood bearing blocks 66*a* are secured and upon which variable thickness bearing strips 66*b* are placed. The beams J are of channel formation so that at their ends they may engage over the blocks 65 and rest on the bearing strips 66*b*. The wood strips 61 for the temporary skid shoes above described are provided with pull rods 67 which have a rope or cable attaching eye 68 so that cables may be fastened onto these rods and be pulled by hand or by a winch so as to move the section 29 along the temporary skids as shown in dotted in Fig. 13 until this section reaches its final position shown in Figs. 14 to 16. Thereafter each of the sections 28 and 29 is jacked up so that the skids may be removed and so that the beams J may be taken out and reoriented to extend transversely of the house as shown in Fig. 16. For supporting the beams J in this position the footings including blocks 65 are turned at right angles to the position shown in Fig. 13, and the end joists are then mounted in metal hangers 69 (see Figs. 20 to 22) which have previously been bolted or screwed to wood mudsill members 70 running lengthwise of the front and back of the house and supported on concrete blocks 71, it being noted that these hangers and the intermediate footings bring the top of the beams J substantially flush with the tops of the mudsills 70 and the mudsill on the underside of the sections 28 and 29. The blocks 63 are then removed and the sections 28 and 29 are then lowered to their final position with their mudsills 43 resting on the top of the side concrete blocks 64 and their end sills resting on the side blocks 71 similar to the blocks 64. Thereafter the intermediate top floor joists 31, which have been removed from the section 28, are placed over the tops of the beams J and bolted together and to the joists 42 of the sections 28 and 29. The floor panels 32 and the wall panels 40 and 41 taken from the section 28, are then put in place, the roof trusses 47 for the intermediate section are then slid over the tops of the wall panels 40 and 41 to their final position and are secured as shown in Fig. 25 to the tops of these panels by lag screws 72 and the ridge pole 73 is then mounted and secured in the notch 48 (see Fig. 24).

Figure 24:
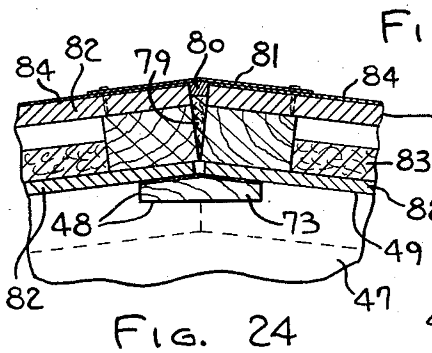
Fig. 24 is a detailed vertical sectional view through the top ridge of the roof.

The roof panels 51 are then put in place over the sections 28 and 29 and the intermediate built-in section. Where they contact the tops of the side walls of the house, they are secured as shown in Fig. 26 to these walls by screws 74. Where they abut each other, the joint between these panels is shown in Fig. 27 and includes the hooklike metal top plate flanges 75 of adjacent panels extending lengthwise thereof and a metal cover strip 76 extending lengthwise of the panels and having hooklike or channeled edges 77 that interlock with the flanges 75 by sliding this strip into position. Before the strip 76 is applied, the adjacent panels are secured to the tops of side walls by lag screws 78 and metal washers 78*a*.

Where the roof panels come together at the ridge pole 73 as shown in Fig. 24, insulation material 79 is tamped into place, a caulking mastic material 80 is placed on top of this insulation between the panels and a metal ridge plate 81 is then nailed down over the ridge portion of the roof, it being noted that each roof panel includes top and bottom siding 82, preferably of plywood top and "Upson" board bottom, a layer of insulation 83, and a top metal plate facing 84, and that these roof panels form the ceiling for the house. The facing 84 is actually formed of a number of sheet metal strips, generally aluminum, suitably joined together.

Figures 25, 27:
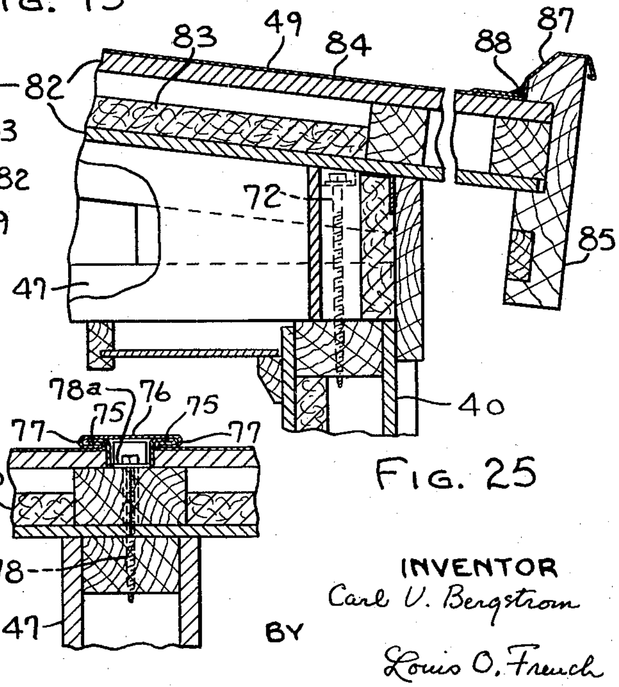
Fig. 25 is a detailed vertical sectional view through the roof, side wall and roof truss.
Fig. 27 is a detailed vertical sectional view showing the jointing together of the roof sections.
Figure 26:
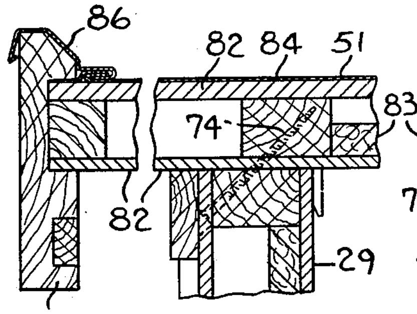
Fig. 26 is a detailed vertical sectional view through an end of the roof.

The gutters for roof drainage are formed by securing facia boarding 85 to the overhanging gable and side edges of the roofing panels and facing the upper ends of these boards and the adjacent portion of the roof panel with a gable end starter strip 86 (see Fig. 26) and an eaves end gutter strip 87 shown in Fig. 25, there being a caulking mastic 88 applied to the gutter.

Figure 6:
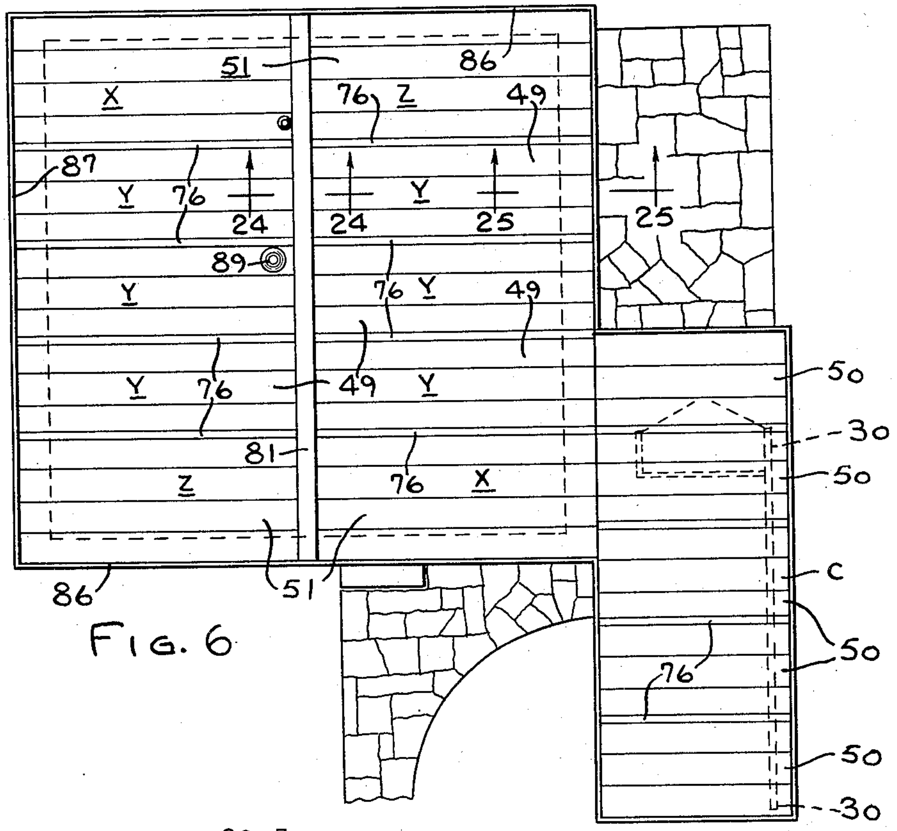
Fig. 6 is a plan view of the completed house.
Figures 17, 18, 19, 20, 21, 22, 23:
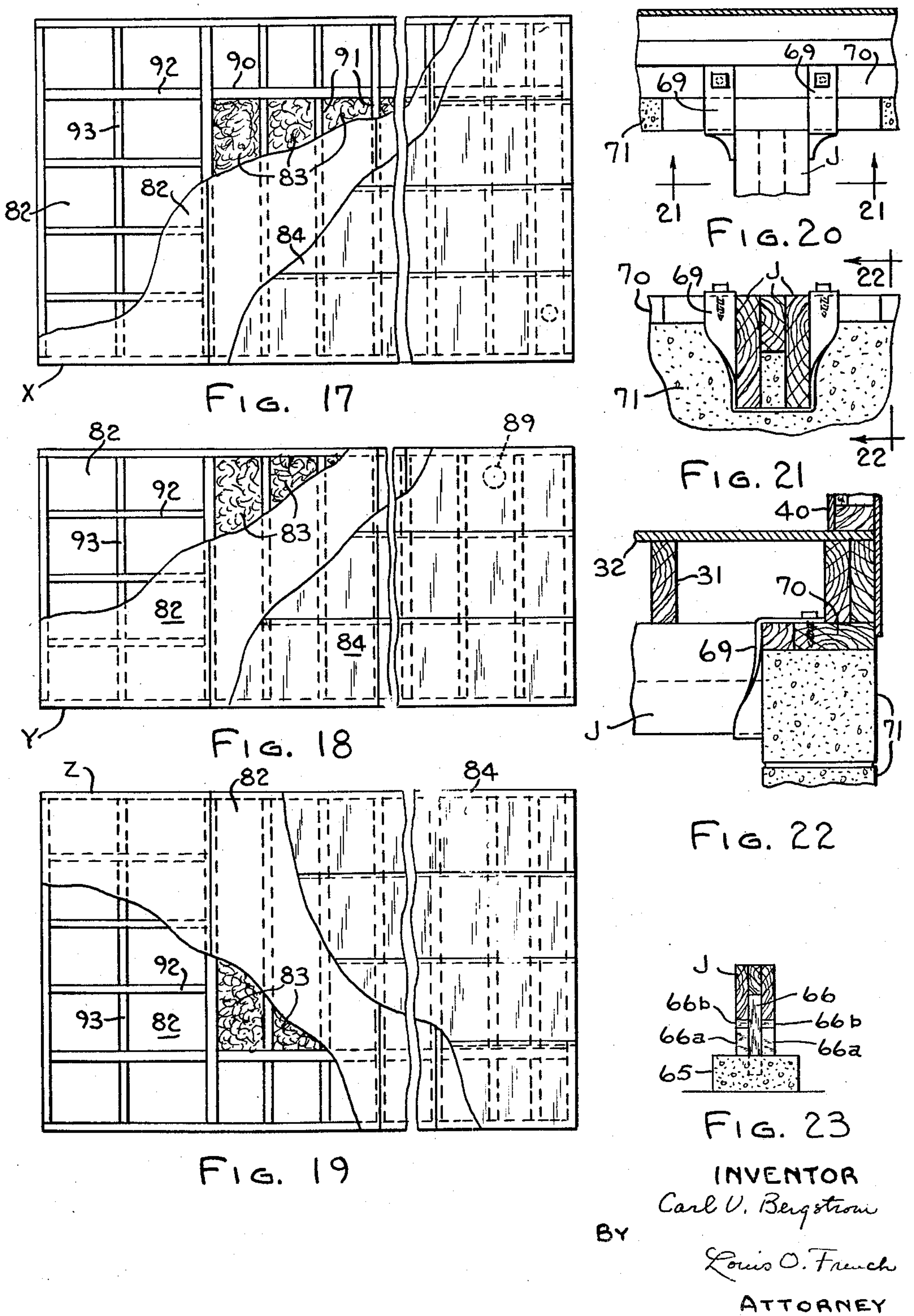
Fig. 17 is a plan view of one of the roof panels, parts being broken away.
Fig. 18 is a plan view of another of the roof panels, parts being broken away.
Fig. 19 is a plan view of another of the roof panels.
Fig. 20 is a plan view of a floor joist beam side wall mounting.
Fig. 21 is a detailed horizontal sectional view taken on the line 21—21 of Fig. 20.
Fig. 22 is a detailed vertical sectional view taken on the line 22—22 of Fig. 21.
Fig. 23 is a detailed vertical sectional view through a floor joist beam support.

The roof panels as shown in Figs. 17 to 19 are of three forms X, Y and Z, and their disposition on the roof is shown in Fig. 6. It will be noted that the Y panels are narrower than the panels X and Z and that one of these has a chimney opening 89. The X and Z panels are generally similar except that the reinforcing frame parts 90 that are connected to the side walls of the house are disposed on different sides of these panels. It will be noted that each of these panels have transversely extending braces 91 and end braces 92 and 93.

Figures 7, 8:
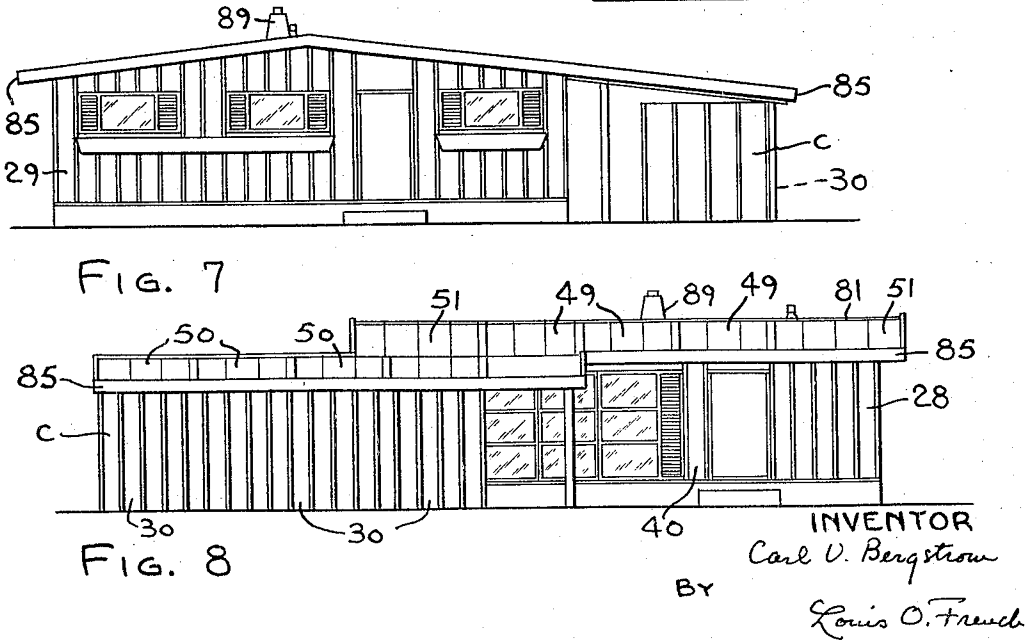
Fig. 7 is a front view of the house.
Fig. 8 is a side view of the house.

The roof panels 50 and the side wall panels 30 for the car port C which were stored aboard the housing unit are put in place to form the finished house as shown in Figs. 6 to 8. The inside partition walls for the house itself may be arranged as shown in Fig. 9 with a furnace or heater F in the central portion of the house.

I desire it to be understood that this invention is not to be limited to any particular form or arrangement of parts except in so far as such limitations are included in the claims.

What I claim as my invention is:

1. A housing unit of prefabricated parts including a pair of completely fabricated housing sections, each section including floor portions and spaced floor joists projecting from the sections, the sets of joists being arranged to be in juxtaposition to each other beneath the floor portions of said sections when said sections are brought into abutting engagement with each other, each of said sections having a mudsill extending inwardly from its outer wall at right angles to said joists to form a supporting ledge for the projecting free end of the floor joists of the other section, and means for clamping said sections together in abutting engagement with each other.

2. The housing unit as defined in claim 1 wherein the outer edge of each mudsill is inclined to permit the projecting free end of the floor joist of the other section to ride up onto the ledge provided by said mudsill.

3. In a housing unit, the combination of a completely prefabricated core section providing a kitchen, laundry and bathroom and an additional compartment and forming the major portion of the unit, and a second prefabricated section arranged in abutting relation with said core section and having a lengthwise extending open space for receiving other prefabricated parts for the house including parts for an intermediate section to be erected on site, each of said sections having floor joists projecting therefrom to form part of the floor joists for said intermediate section, the floor joists for said second section projecting from the same and arranged in lateral juxtaposed relation with the floor joists of the core section to reinforce the same, means on each section for supporting the free ends of the joists of the other section, and means for binding said sections together in abutting relation as a shipment package of legal width for highway transportation.

4. A housing unit of parts including a pair of fabricated sections having end walls, side walls provided with gabled ends, floors, and floor joists, side wall panels, partition wall panels, and floor joists for an intermediate section, roofing panels for all the sections, and roof trusses for said panels arranged for transportation as a unit complying with highway trucking legal requirements wherein the fabricated sections are joined together as a unit, the above named parts for said intermediate section are disposed within the said fabricated sections, the roof trusses are mounted on the top of one of said fabricated sections, some of the roof panels are mounted on the top of the other fabricated section in gable simulating arrangement and other roof panels are disposed in roof forming inclination over said last named panels and said roof panels are temporarily secured to the gable ends of said fabricated sections and thus form a roof for the unit.

References Cited in the file of this patent

UNITED STATES PATENTS

| | | |
|---|---|---|
| 1,156,693 | Koger | Oct. 12, 1915 |
| 1,965,450 | Brown | July 3, 1934 |
| 2,089,059 | Harley | Aug. 3, 1937 |
| 2,127,580 | Bartholowsky | Aug. 23, 1938 |
| 2,296,413 | Zell | Sept. 22, 1942 |
| 2,355,663 | McGothlin | Aug. 15, 1944 |
| 2,365,579 | Mulligan | Dec. 19, 1944 |
| 2,494,680 | Wiley | Jan. 17, 1950 |
| 2,519,517 | Van Tassel | Aug. 22, 1950 |

FOREIGN PATENTS

| | | |
|---|---|---|
| 572,998 | Germany | July 12, 1933 |
| 503,627 | Great Britain | Apr. 12, 1939 |
| 131,809 | Australia | Mar. 17, 1949 |
| 976,190 | France | Oct. 25, 1950 |
| 822,893 | Germany | Nov. 29, 1951 |
| 1,010,403 | France | Mar. 26, 1952 |